March 22, 1949.  T. PAISLEY  2,464,937
CONTAINER LABELING MACHINE
Filed Sept. 13, 1945  2 Sheets-Sheet 1

INVENTOR.
Taylor Paisley.
BY
Harness, Dickey & Pierce.
ATTORNEYS.

March 22, 1949. T. PAISLEY 2,464,937
CONTAINER LABELING MACHINE
Filed Sept. 13, 1945 2 Sheets-Sheet 2

INVENTOR.
Taylor Paisley.
BY Harness, Dickey & Pierce
ATTORNEYS.

Patented Mar. 22, 1949

2,464,937

UNITED STATES PATENT OFFICE 2,464,937

CONTAINER LABELING MACHINE

Taylor Paisley, Ferndale, Mich.

Application September 13, 1945, Serial No. 616,045

3 Claims. (Cl. 216—60)

The present invention relates to a semi-automatic container labeling mechanism adapted to affix a glued label or the like to a generally cylindrical object such as a bottle, jar or can.

A great many concerns are engaged in packaging a wide range of products in jars, cans, or bottles on a relatively small scale such that it is not economical to employ automatic labeling machinery or specially lithographed containers. It has been necessary in the past for such concerns to apply glued labels to the containers by hand because of the lack of a label applying machine sufficiently inexpensive to warrant its use for relatively small production.

It is the general object of the present invention to provide a simple, practical and inexpensive semi-automatic labeling machine suited for the use of concerns whose production is limited.

Another object of the invention is to provide a machine of the type mentioned which may be readily adapted to accommodate labeling of containers of different sizes.

Another object is to provide a machine of the type mentioned which may be operated at high speed by an inexperienced operator.

Other objects and advantages will become apparent from the following specification, accompanying drawings, and appended claims.

Figure 1:
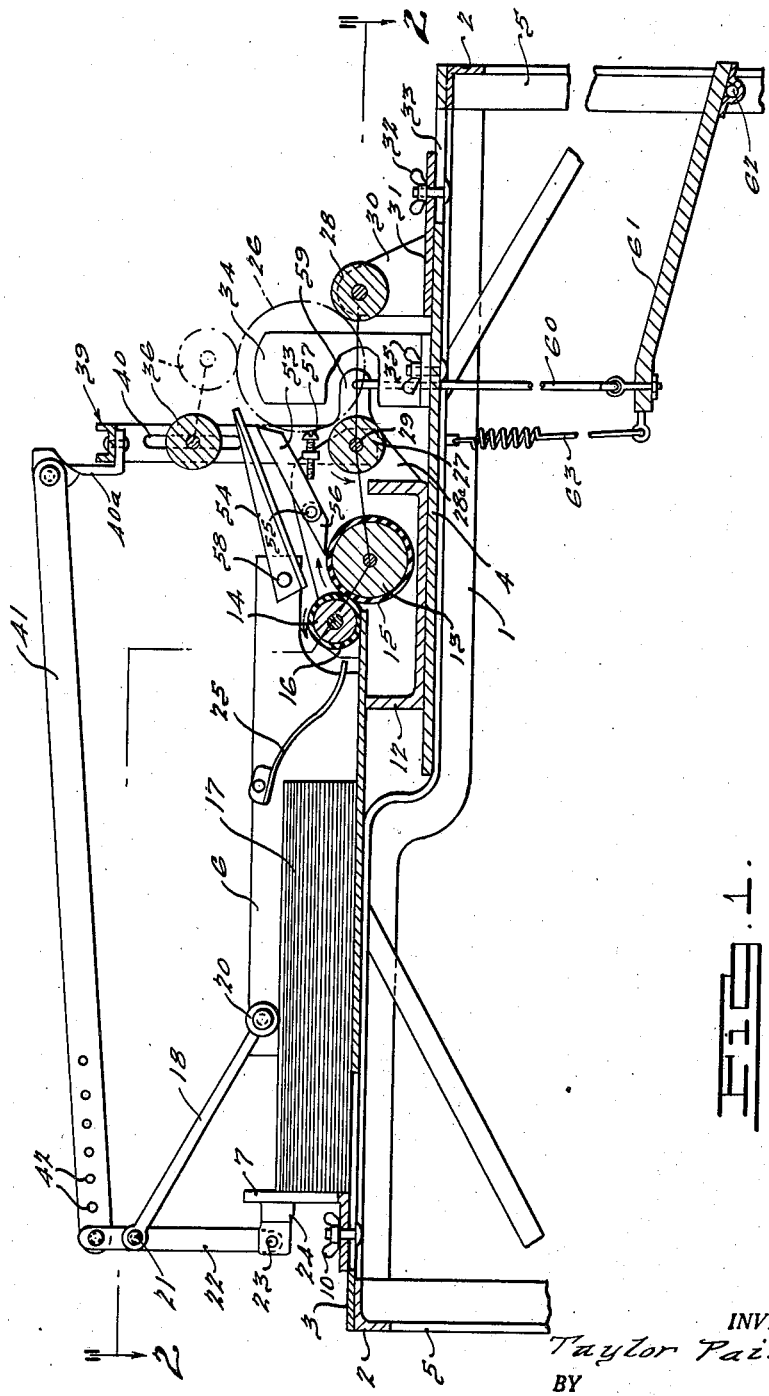
Figure 1 is a longitudinal section taken through the machine with parts broken away to facilitate illustration.
Figure 2:
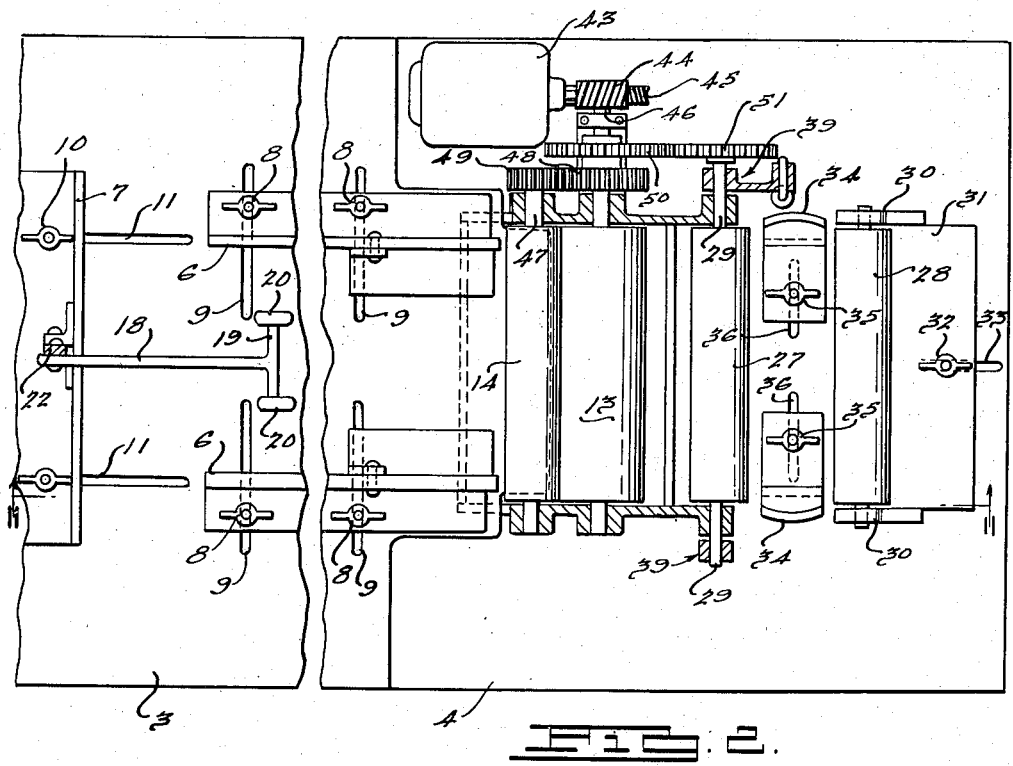
Figure 2 is a horizontal section view taken of line 2—2 of Figure 1.

As best shown in Figure 1, the apparatus is supported upon a table which may be of any suitable construction. As illustrated, the preferred form of table is built up of a marginal rim of angle iron construction, including longitudinal angle irons 1 and transverse angle irons 2. The longitudinal angle irons 1 are of stepped form and support a pair of top plates 3 and 4 which are located at different levels and which overlap each other to a limited extent. The table structure is supported in any suitable manner as by angle iron legs 5 located at the corners.

An adjustable label magazine is provided on the top section 3 by means of a pair of longitudinally extending angle shaped members 6 and a transversely extending angle shaped member 7. The members 6 are adjustable toward and away from each other and may be fixed in any desired position of adjustment by means of bolts having wing nuts 8. The bolts extend through suitable openings in the members 6 and slots 9 formed in the top plate member 3. The member 7 is similarly adjustable longitudinally of the table and fixed in position by means of bolts having wing nuts 10 and which pass through openings in the member 7 and a pair of slots 11, formed in the table top.

The table top section 3 partially overlies a reservoir 12 which is fixed to the table top section 4 and which is adapted to contain either water for moistening glued labels or liquid glue for glueing unglued labels in the usual manner. For this purpose, a moistening roller 13 is journaled in the end walls of the reservoir 12 in such a position that it dips into the glue or water in the reservoir. A feed roller 14 is similarly journaled in the end walls of the reservoir and bears against the roller 13. Preferably both rollers 13 and 14 are provided with a rubber coating such as the coatings 15 and 16 illustrated in drawings, but the coating on the roller 13 may be omitted if desired. The rollers 13 and 14 operatively engage each other and the roller 14 lightly touches the top surface of the plate 3 with the result that when a label is fed beneath the roller 14, it will be propelled thereby between the rollers 13 and 14.

The labels, indicated at 17, are stacked in the magazine with their under surfaces down; and means are provided for feeding them one at a time to the feed roller 14. This means comprises a push rod 18 having a transverse end portion 19 provided with a pair of rubber-like label engaging members 20. The pusher lever 18 is pivoted at 21 to a vertically extending lever 22 which, in turn, is pivoted at 23 on a bracket 24 formed on the member 7 of the magazine structure. As a result of this arrangement, clockwise rotation of the lever 22 about its pivot 23 will feed one label toward the feed roller 14. Suitable curved guide members 25 are fixed to the magazine members 6 to insure that the label fed from the top of the stack by the pusher will pass beneath the feed roller 16. Return or counterclockwise rotation of the lever 22 will not effect movement of the labels due to the fact that their rear edges bear against the member 7. Consequently, oscillation of the member 22 will effect a feed of labels one at a time to the feed rollers 14.

The container to be labeled, indicated in dotted lines in Figure 1 at 26, is placed upon a pair of supporting rollers 27 and 28. The shaft 29 of roller 27 is journaled at its ends in a pair of projecting ears 28a formed on the reservoir 12, while the roller 28 is similarly journaled between a pair of upstanding arms 30 formed on an adjustable support 31. The support is in the form of a flat plate which is adjustably fixed to the table top section 4 by means of a bolt having a thumb nut 32 and passing through a suitable opening in the member 31 and a longitudinal slot 33 formed in the table top. It is obvious that by shifting member 31 longitudinally with respect to the slot 33, the spacing of the rollers 27 and 28 may be varied to accommodate containers of different diameters. In addition, a slightly conical form of container may be accommodated by angularly adjusting the member 31 about the fastening bolt.

In order to prevent endwise displacement of the containers with respect to the rollers 27 and 28, a pair of angle brackets 34 is provided for engaging the ends of the container. The brackets 34 are adjustable toward and away from each other and are fixed in any desired adjusted position by means of bolts having thumb nuts 35. The bolts extend through openings formed in the brackets and through transverse slots 36 formed in the table top section 4.

A pressure roller 36 is provided for engaging the top portion of the container in the manner best shown in dotted lines in Figure 1 and holding it in pressure engagement with the rollers 27 and 28 in order to press the label firmly against the container. The shaft 37 of roller 36 is journaled in a pair of bearing blocks 38 which are adjustably carried by a yoke-shaped bell crank lever indicated generally at 39. The lever 39 is pivoted on shaft 29 and is formed of a channel section. The vertical arms of the lever are provided with slots 40 which receive the ends of the shaft 37. Bearing blocks 38 are positioned within the channel and may be fixed in any desired vertical adjustment by means of bolts having thumb nuts 41. The bolts extend through openings formed in the blocks 38 and also through slots 40. Accordingly, the position of the pressure roller may be adjusted to accommodate containers of differing sizes.

It will be noted that lever 39 may be swung from the vertical position illustrated in Figure 1 about the axis of the shaft 29 in order to shift the pressure roller into the dotted line position in which it presses the container against the rollers 27 and 28. This swinging movement of lever 39 is utilized to effect the feed of a label to the feed roller 14. This is accomplished by connecting the lever 39 to the previously mentioned lever 22. Thus the lever 39 is provided with a bracket 40a to which is pivoted a link 41, the other end of which is pivoted to the upper end of lever 22. A plurality of pivot openings 42 are provided in the link 41 in order to accommodate longitudinal adjustment of the magazine member 7.

Figure 3:
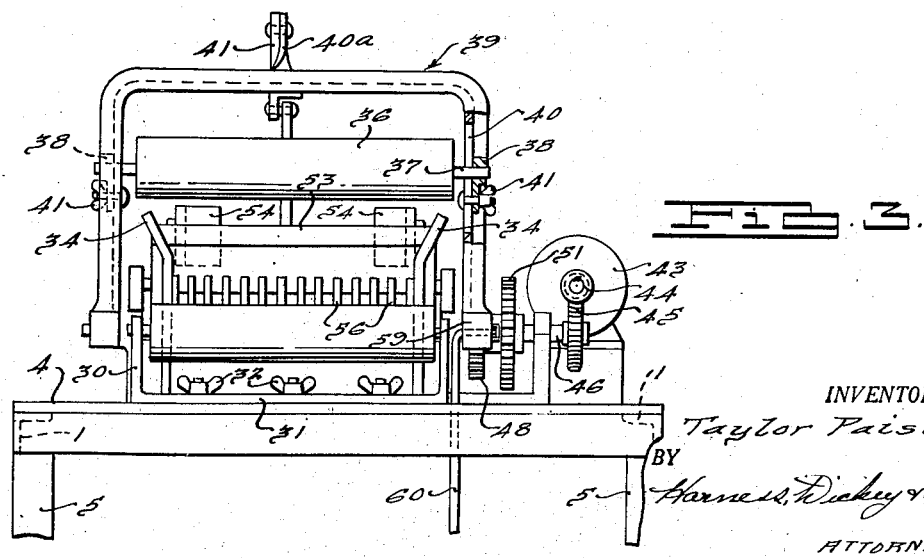
Figure 3 is an end elevation of the machine.

The rollers 13, 14 and 27 are constantly rotated in the direction indicated by the arrows in Figure 1, from any suitable source of power. In the preferred construction illustrated, a shaft of a motor 43 is provided with a worm 44 which drives the worm wheel 45, mounted upon the shaft 46 of the roller 13. Shaft 46, in turn, is connected to the shaft 47 of roller 14 by means of gears 48 and 49, and is also connected to the shaft 29 of roller 27 by means of gears 50 and 51. The arrangement of gears is such that the surface speeds of the rollers 13, 14 and 27 are equal. Consequently, labels discharged by rollers 13 and 14 will be fed to the container at a speed equal to the surface speed of the container. In order to ensure the label will be properly fixed to the container, it is guided into a position between the roller 36 and the container by means of a lower guide plate 53 and a pair of upper guide members 54, shown best in Figures 1 and 3. The lower guide plate 53 is pivotally mounted on a shaft 55 extending between the end plates of reservoir 12.

The lower edge of the lower guide plate 53 is provided with a plurality of slots and a plurality of fingers 56 extend into the slots and are also journaled on the shaft 55. The free ends of the fingers 56 bear on the roller 13 and serve to strip labels from the roller. For this purpose, the periphery of the roller may be grooved and fingers 56 may project into the grooves of the roller 13 to facilitate the stripping operation in accordance with conventional practice. The angle of the lower guide plate 53 may be adjusted to accommodate containers of different sizes by adjusting a screw 57, shown best in Figure 1.

The upper guide members 54 serve to prevent the labels from passing above the roller 36. They are pivotally connected to the longitudinal magazine member 6 by means of stove bolts 58, which may be tightened to retain them in any desired angular position.

The bell crank lever 39 is provided with a short horizontally extending arm 59 which is connected by means of a link 60 to a foot pedal 61, which in turn is pivoted on a shaft 62 extending between a pair of the table legs 5. As a result, downward movement of the pedal 61 will effect clockwise rotation of the levers 29 and 32. When the foot pedal is released, the parts are returned to the position indicated in Figure 1 by means of a spring 63. Any suitable means may be provided for limiting the return movement of the parts to the position illustrated.

The operation of the machine is as follows: with the motor 43 started, the rollers 13, 14 and 27 will be rotated continuously while the remaining parts remain in the position illustrated in Figure 1. The operator then places a container on the rollers 27 and 28 between the end brackets 34. As soon as the container is in position, the operator depresses the pedal 61. This effects a clockwise swinging movement of the levers 39 and 22. As a result, a label is fed beneath the feed roller 14 and carried thereby between rollers 13 and 14 where it is moistened and fed to the container. Simultaneously with the feed of a label to the feed roller 14, the pressure roller 39 will swing into the dotted line position illustrated wherein it clamps the container tightly against the rollers 27 and 28. Due to the power rotation of the roller 27, the container will be rotated on its own axis in a clockwise direction as viewed in Figure 1 and will, in turn, rotate the rollers 28 and 36 on their axes. During such rotation, the label discharged by the rollers 13 and 14 will pass upward over the lower guide plate 53 and between the roller 36 and the container.

The roller 36 will press the label tightly against the container and the labeled container will be rotated between rollers 27, 28 and 36 until the label is securely affixed to the container. The rotation of the labeled container will continue as long as the operator maintains the pedal 61 depressed. Accordingly, as soon as the label is fully applied, the pedal may be released and the labeled container removed. Since both hands of the operator are free, the labeled container may be removed with one hand and a new container placed into position simultaneously, following which the pedal may be again depressed to repeat the operation. As a result, a single operator may label a large number of containers in a very short time.

It is apparent that there is provided in accordance with the present invention, an exceedingly simple, practical and rapid machine for applying glued labels to containers at high speed. The machine contains simple adjustments to accommodate labels and containers of various sizes.

While only a form of the invention is illustrated and described, it will be apparent that variations in the details of construction of the label feeding mechanism or the label moistening mechanism may be indulged in without departing from the spirit of the invention or the scope of the appended claims.

What is claimed is:

1. A container labeling machine including a pair of rollers adapted to support a container during rotation of the container on its own axis, means for rotating the container, a pressure roller movable into engagement with a container and effective to clamp it against said pair of rollers, a label feeding means adapted when actuated to feed a label between the container and one of said rollers, an operating element effective on movement in one direction from its normal position to move said pressure rollers against a container supported by said pair of rollers and simultaneously actuate said feeding means, and means for returning said operating element to its normal position.

2. A container labeling machine including a pair of rollers adapted to support a container during rotation of the container on its own axis, a pressure roller movable into engagement with a container and effective to clamp it against said pair of rollers, means for continuously rotating one of said rollers, label feeding means adapted when actuated to feed a label between the container and one of said rollers, an operating element effective on movement in one direction from its normal position to move said pressure roller against a container supported by said pair of rollers and simultaneously actuate said feeding means, and means for returning said operating element to its normal position.

3. A container labeling machine including a pair of rollers adapted to support a container during rotation of the container on its own axis, a pressure roller movable into engagement with a container and effective to clamp it against said pair of rollers, means for continuously rotating one of said rollers, a label magazine, means including a continuously rotating label feed roller for feeding labels between the container and one of the rollers, a single control element operable on movement in one direction from a normal position to feed a label into feeding engagement with the feed roller and simultaneously move said pressure roller into engagement with a container supported by said pair of rollers, and means for automatically returning said element to normal position.

TAYLOR PAISLEY.

REFERENCES CITED

The following references are of record in the file of this patent:

UNITED STATES PATENTS

| Number | Name | Date |
| --- | --- | --- |
| 266,315 | Richardson | Oct. 24, 1882 |
| 709,499 | Morrison | Sept. 23, 1902 |
| 897,845 | Noyes | Sept. 1, 1908 |